US005488359A

United States Patent [19]

Faris et al.

[11] Patent Number: 5,488,359

[45] Date of Patent: Jan. 30, 1996

[54] METHOD AND APPARATUS FOR SETTING A MEMORY FULL CONDITION IN A SELECTIVE CALL RECEIVER

[75] Inventors: Randi W. Faris, Boca Raton; Christopher Henz, Lake Worth, both of Fla.

[73] Assignee: Motorola, Inc., Schaumburg, Ill.

[21] Appl. No.: 308,851

[22] Filed: Sep. 19, 1994

[51] Int. Cl.[6] .......... H04Q 7/14

[52] U.S. Cl. .......... 340/825.44; 340/825.15

[58] Field of Search .......... 340/825.44, 825.48, 340/311.1, 825.15, 825.27; 455/38.2, 38.4; 379/56, 57

[56] References Cited

U.S. PATENT DOCUMENTS 4,812,813 3/1989 Ide et al. .......... 340/311.1

4,851,829 7/1989 DeLuca et al. .......... 340/825.44

*Primary Examiner*—Donald J. Yusko
*Assistant Examiner*—Edwin C. Holloway, III
*Attorney, Agent, or Firm*—D. Andrew Floam

[57] ABSTRACT

A method and apparatus for optimizing utilization of a memory which stores messages received in a portable communication device "40". The memory full threshold for the memory "200" is adjustable. The amount of space available in the memory "200" is determined and is compared with the memory full threshold. If the amount of space available in the memory is less than the memory full threshold, an indication is made to the user, who can opt to delete a message in order to make room in the memory. When a new message is received, if the amount of space available in the memory is less than the size of the new message, a previously stored message is deleted in order to make space for the newly received message in the memory.

16 Claims, 5 Drawing Sheets

METHOD AND APPARATUS FOR SETTING A MEMORY FULL CONDITION IN A SELECTIVE CALL RECEIVER

FIELD OF THE INVENTION

The present invention relates in general to the field of selective call receiver communication systems, and more particularly to adjustably setting a message full condition in a selective call receiver.

BACKGROUND OF THE INVENTION

Currently, selective call receivers (pagers) offer a memory full indication feature for indicating to the user that there is insufficient space in memory for storing a new message, such as an alphanumeric message. Memory full indication occurs when a fixed number of characters remain in the device or when a new message is guaranteed to delete an existing message. In devices heretofore known, the memory full threshold is fixed at manufacture. With reference to FIG. 5, often, a particular user receives messages in step 100 which are much shorter than the length of messages on which the preset memory full condition is triggered. Consequently, a memory full indication will be made prematurely in step 102 and a stored message is unnecessarily deleted in step 104 before the new message is stored in step 106.

Other users of the same selective call receiver model find that the preset memory full threshold is satisfactory. However, the fixed memory full threshold does not optimize the use of the memory of the selective call receiver because the length of the received messages vary.

Thus, it is desirable to provide for an adjustable and/or adaptive memory full threshold to avoid unnecessary deletion of previously received and stored messages.

SUMMARY OF THE INVENTION

According to one aspect, the present invention relates to a portable communication device for receiving messages transmitted thereto, the device comprising:

- a receiver for receiving a signal including a message;
- a memory for storing messages received by the portable communications device;
- an input for receiving input including an adjustable memory full threshold;
- a processor for determining an amount of space available in a memory and for comparing the amount of space available in the memory with the memory full threshold, the processor issuing an indication of a memory full condition if the amount of space available in the memory is less than or equal to the memory full threshold, said processor further determining the amount of space available in the memory of the portable communication device in response to receiving a new message and determining a size of the new message, the processor deleting a previously stored message from the memory if the amount of space available in the memory is less than the size of the new message and storing the new message in the memory, and if the amount of space available in the memory is greater than or equal to the size of the new message, then storing the new message in the memory without deleting a previously stored message.

According to another aspect, the present invention relates to a method for optimizing utilization of a memory which stores messages received in a portable communication device comprising steps of:

- providing an adjustable memory full threshold for indicating a memory full condition of the memory;
- determining an amount of space available in the memory of the portable communication device;
- comparing the amount of space available in the memory with the memory full threshold;
- issuing an indication of memory full if the amount of space available in the memory is less than or equal to the memory full threshold;
- receiving a new message in the portable communication device;
- determining the amount of space available in the memory of the portable communication device in response to receiving the new message and determining a size of the new message;
- deleting a previously stored message from the memory if the amount of space available in the memory is less than the size of the new message and storing the new message in the memory; and
- if the amount of space available in the memory is greater than or equal to the size of the new message, then storing the new message in the memory without deleting a previously stored message.

In a first embodiment, the memory full threshold is user programmable by user input, or alternatively is programmable after manufacture by an external programming device. In a second embodiment, the memory full threshold is continuously adjusted according to an updated average length of messages received by the portable device.

DESCRIPTION OF A PREFERRED EMBODIMENT

Figure 1:
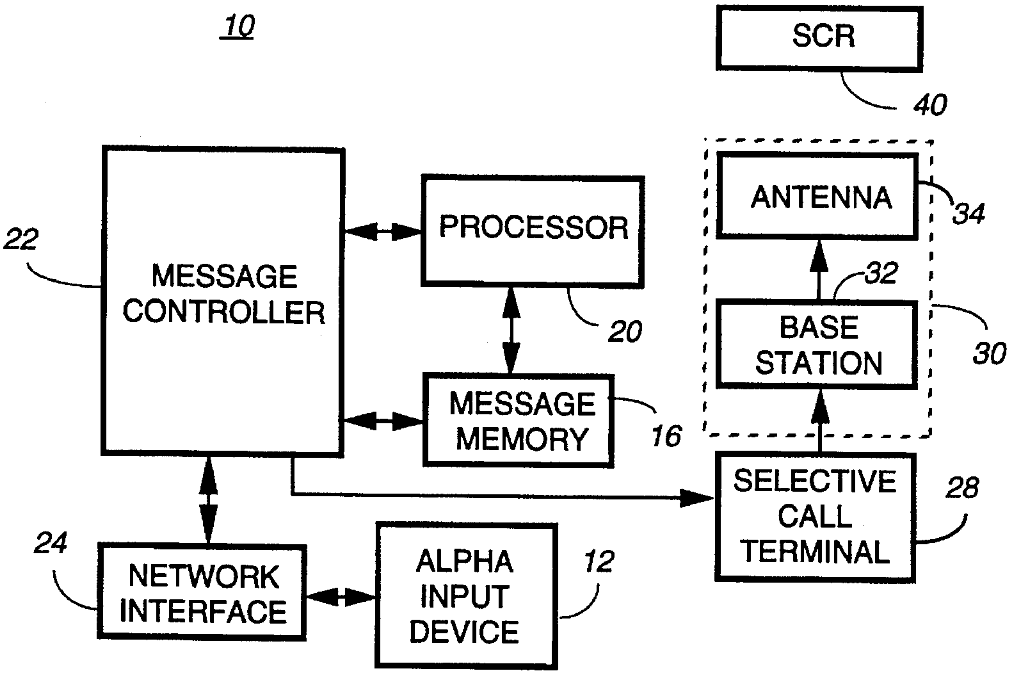
FIG. 1 is a block diagram of a selective call receiver communication system according to the present invention.

Referring first to FIG. 1, there is shown a selective call receiver system 10 comprising an alphanumeric input device 12, such as a specially designed keyboard input device or a computer with appropriate paging message software, a selective call station and at least one selective call receiver 40. The selective call station comprises a message memory 16, a selective call terminal processor 20, a message controller 22, a network interface 24, such as a public telephone switching network (PTSN), a selective call terminal 28, and a transmitter 30 comprising a base station 32 and an antenna 34.

The interaction of the various components of the selective call receiver system 10 is well known in the art. Briefly, an alphanumeric message is input at the alphanumeric input device 12 which then dials the message controller 22 for connection via the network interface 24. The message is received and stored in the message memory 16 for processing by the processor 20. The processor 20 generates a digital representation of the message and determines the address of the selective call receiver designated to receive the message. The digital representation of the message is incorporated in a paging signal and transmitted by the transmitter 30 for detection and reception by,the appropriate selective call receiver.

Figure 2:
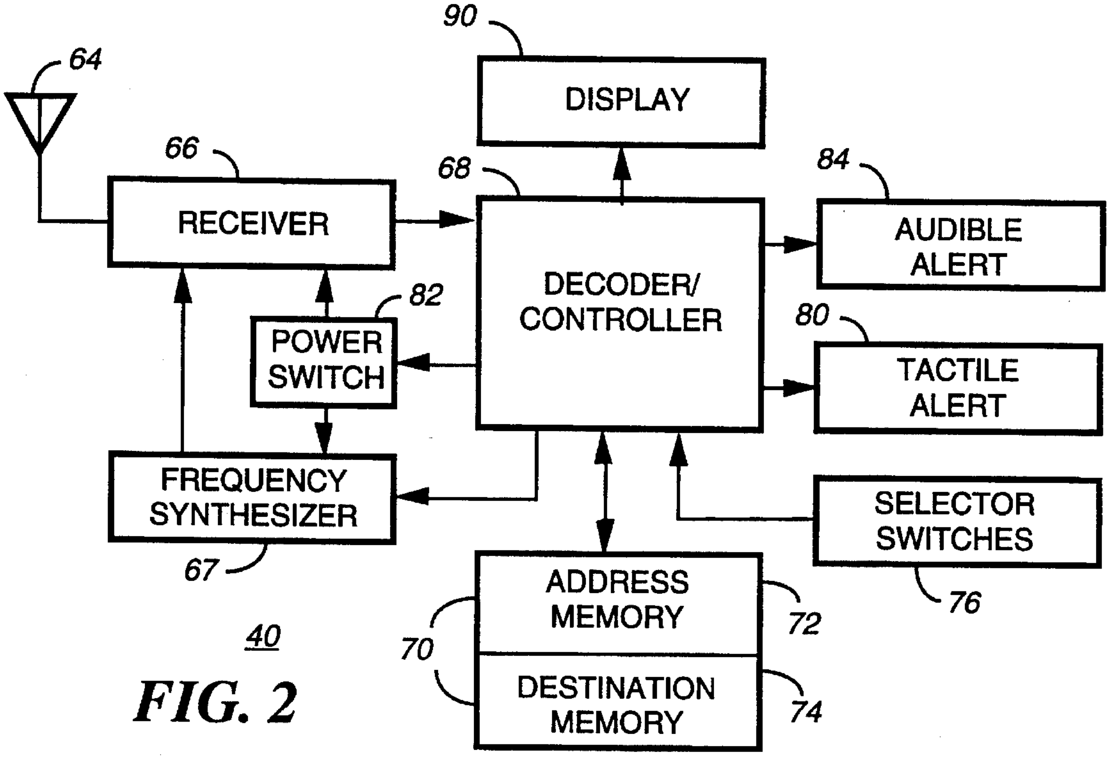
FIG. 2 is a block diagram of a selective call receiver according to the present invention.

FIG. 2 shows the components of the selective call receiver 40. The selective call receiver 40 comprises an antenna 64, a receiver 66, a frequency synthesizer 67, a decoder/controller 68, and a codeplug memory 70 including an address memory 72 and a destination memory 74. The codeplug memory 70 is programmable by a remote programming device, as is well known in the art. In addition, various alert devices are provided, such as the tactile alert 80 and the audible alert 84. A power switch 82 is also provided to activate and de-activate certain components of the SCR 40 under control of the decoder/controller 68. The receiver 66 includes circuitry for demodulating a paging signal, as is well known in the art.

User input into the selective call receiver is by way of selector switches 76. A menu of various user programmable features is accessed via the switches, through the use of menu information displayed on the display 90. The selector switches 76 allow, for example, "up" or "down" adjustment of user programmable features, such as the memory full threshold, to be described hereinafter.

Figure 3:
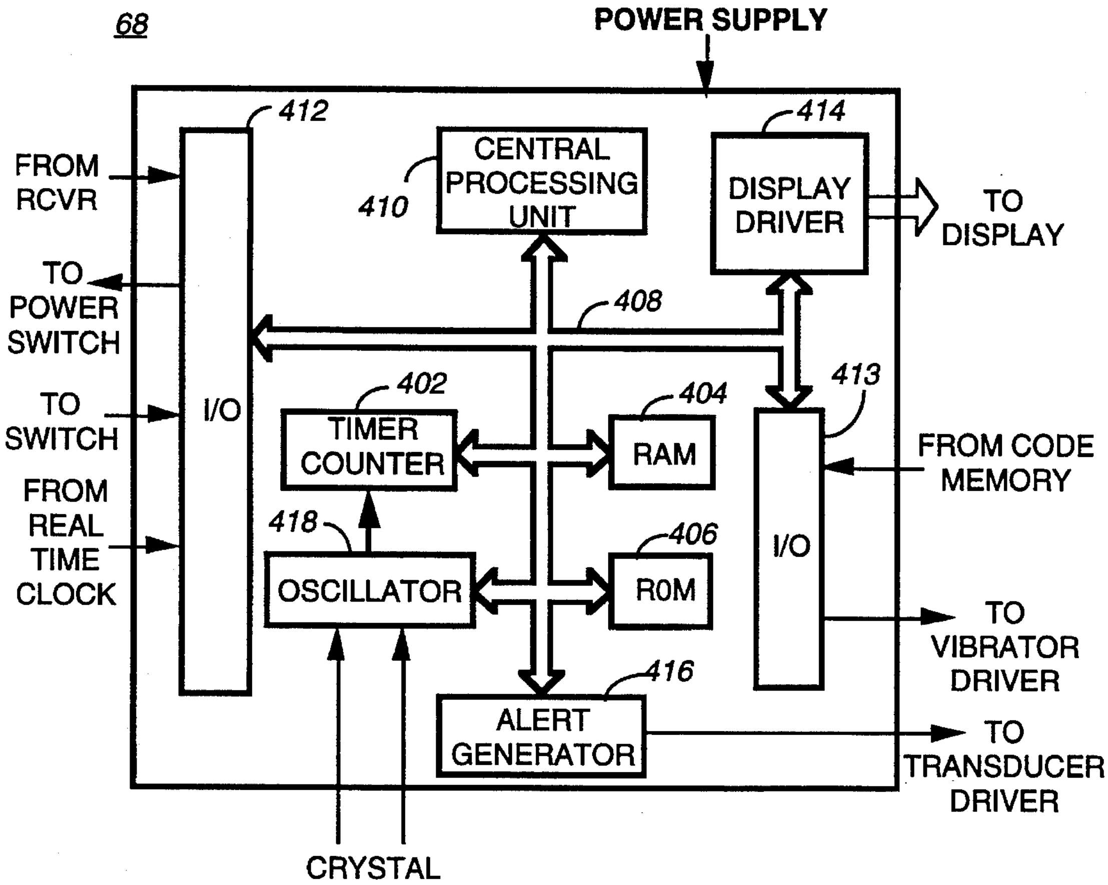
FIG. 3 is an electrical block diagram of a decoder/controller of a selective call receiver according to the present invention.
Figure 5:
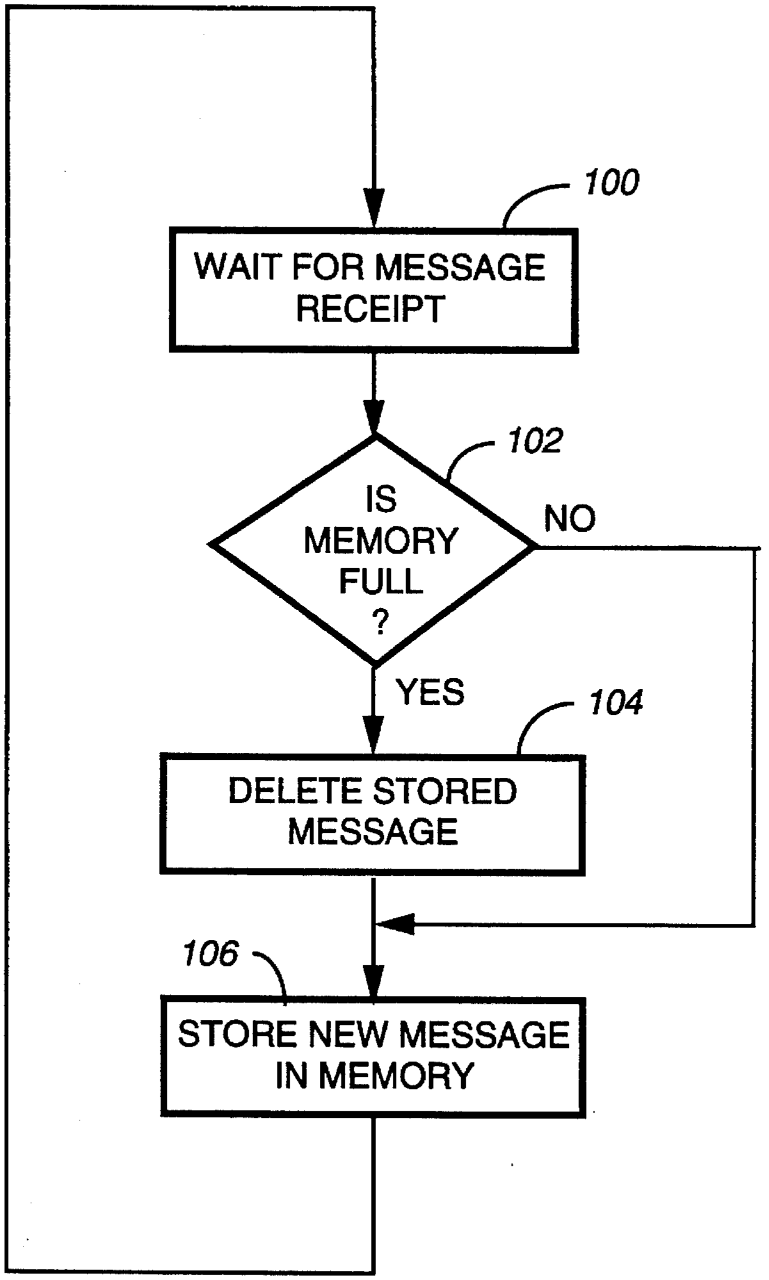
PRIOR ART FIG. 5
FIG. 5 is a flow chart diagram illustrating a prior art technique of handling a message full condition.

FIG. 3 illustrates the decoder/controller 68 in greater detail. Briefly, at its heart, the decoder/controller 68 comprises a central processing unit 410 which processes software instructions stored in a (read only memory) ROM 406. Data flow into and out of the decoder/controller 68 is controlled by input/output (I/O) ports 412 and 413. A timing mechanism for the SCR is generated by a crystal driven oscillator 418. A timer counter 402 is connected to the oscillator 418 for certain timing functions.

The central processing unit 410 generates display control signals which are used to drive the display 90 (FIG. 2), and to call for generation of alert signals via an alert generator 416. In addition, a (random access memory) RAM 404 is provided for storing various information, including incoming messages in preparation for display via the display driver 414.

Figure 4:
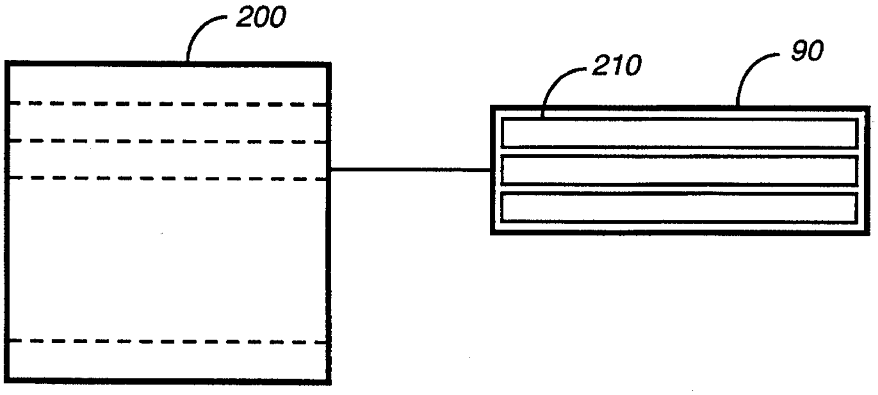
FIG. 4 is a diagram illustrating a memory and a display of the selective call receiver.

In accordance with the present invention, software is stored in the decoder/controller for implementing a more flexible message full indication feature. FIG. 4 illustrates a message memory 200 and the display 90 of the selective call receiver 40. The message memory 200 is either an entire RAM module, or is a portion of a RAM module. In any event, the message memory 200 is finite in size, and is capable of storing a plurality of messages. However, as the memory 200 becomes filled, the amount of space remaining is monitored to be sure that there is enough space to store a new message.

The display 90 is capable of displaying information on one or more lines 210, wherein each line has a certain number of characters. For example, the display 90 has three lines, each 20 characters in length. Messages are transferred from the message memory 200 to the display 90 in response to commands entered by the user, as is well known in the art.

In order to make room for incoming messages, the amount of space unoccupied in memory 200 is monitored and compared with a memory full threshold. For example, the memory full threshold is 40 characters, which indicates that if there is less than 40 characters of memory space unoccupied in the memory 200, then a memory full declaration is made.

Figure 6:
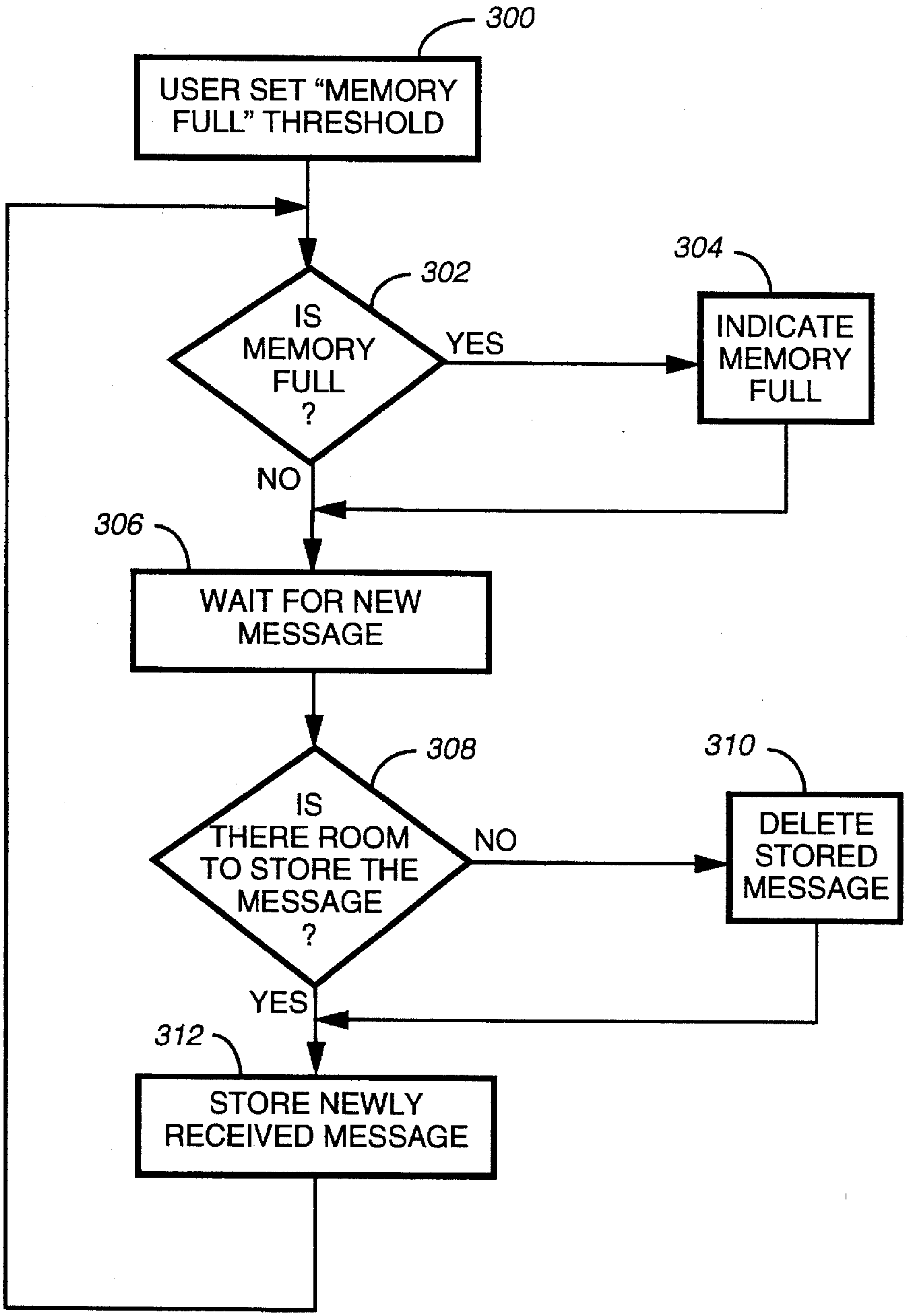
FIG. 6 is a flow chart diagram illustrating a user adjustable memory full threshold according to a first embodiment of the present invention.

Turning now to FIG. 6, the first embodiment of the present invention will be described. In step 300, a user is given a prompt, or an appropriate menu mode is entered, allowing the user to set the memory full threshold. Alternatively, the memory full threshold is set via a remote programming device which communicates with the selective call receiver through the codeplug memory 70.

Next, in step 302, the amount of space remaining in the memory 200 is compared with the memory full threshold. If the amount of space remaining in the memory is less than or equal to the memory full threshold, then a message is displayed, sound emitted, or other indication made to the user in step 304. In any event, in step 306, the device enters a wait for new message mode. When a message is received, a comparison is made in step 308 between the space remaining in the memory 200 and the size of the newly received message. The size of the new message is determined by examining a "header" of the message, or by other techniques well known to those with ordinary skill in the art. If the space remaining in the memory 200 is less than the size of the new message, a message is deleted from the memory 200 in step 310 to make space for the new message which is then stored in step 312. If the space remaining in the memory is greater than or equal to the size of the new message, the new message is stored in step 312 without deleting a previously stored message.

The message that is deleted is one which is "unprotected". A "protected" message is one which has been designated as containing important information worthy of saving. For example, a protected message is one that is "locked" in memory by the user if the user does not want the message to be erased in the event space is needed in the memory for the new messages. Another type of message that is protected is one which is "alarmed" by the user, so that a reminder message is generated in the future on the basis of the particular message.

In the case where the memory full threshold is controlled by user input, further adjustments to the memory full threshold are optionally made periodically, or as necessary, to manually keep up with changing message receiving habits of the user.

As an example, suppose a user normally receives messages that are 30 characters in length. The user sets the memory full threshold to 35, for example. Thus, the amount of space remaining in memory 200 is determined and compared with the memory full threshold. If the amount of space remaining is less than the memory full threshold, then an indication is made to the user. The user can decide to delete a message at this point, if so desired. Otherwise, the device waits until a new message is received. When a new message is received, the amount of space in the memory is detected in order to determine if there is space for the storing the new message. If not, a stored message, such as an unprotected message is automatically deleted. Otherwise, if enough space exists, the newly received message is stored without deleting a stored message.

Figure 7:
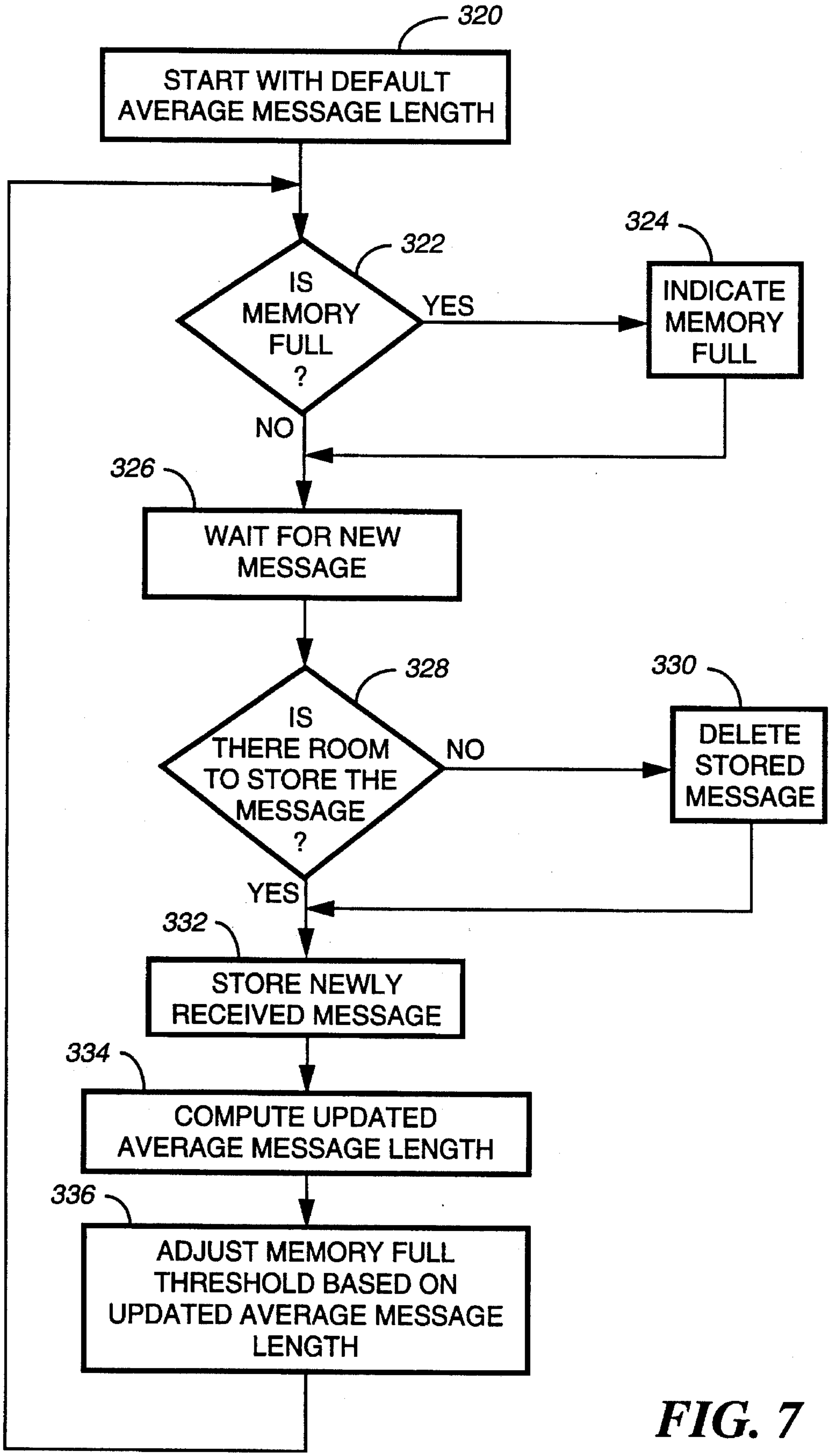
FIG. 7 is a flow chart diagram illustrating an adaptive memory full threshold according to a second embodiment of the present invention.

FIG. 7 illustrates a second embodiment of the present invention. In this embodiment, the memory full threshold is automatically adjusted by continuously determining the average length of messages received by the selective call receiver. Step 320 indicates an initialization of the average message length. This initialization is preferably made at the time of manufacture, or alternatively at the time of sale by a remote programming device via the codeplug memory. Next, in step 322, the amount of space remaining the memory is compared with the memory full threshold. If the space remaining in the memory is less than or equal to the memory full threshold, then an indication is made in step 324.

Otherwise, in step 326, the device enters a wait for new message mode. When a message is received, the amount of space remaining in the memory and the size of the newly received message are compared. If there is not enough room in the memory to store the newly received message, in step 330, a stored message, such as an unprotected message, is deleted. In step 332, the newly received message is stored, either with or without deleting a stored message.

Next, in step 334, an updated average message length is computed based on a previous average message length (or the default average message length if it is the first iteration). Then, in step 336, the memory full threshold is adjusted on the basis of the updated average message length. For example, if the updated average message length is determined to be 33 characters, then the memory full threshold is set to 35 characters, for example. The procedure repeats after step 336 from step 322 as shown in the figure.

An advantage of the second embodiment is that the amount of remaining memory space is optimized because the memory space reserved before a memory full indication occurs is adjusted with the receipt of each new message. Moreover, the memory full threshold is automatically adjusted for the changing message receiving habits of the user. No input by the user is necessary. Further yet, the features of the first and second embodiments are combinable so that, even when the average message length is continuously updated, the user is given the option to manually set the memory full threshold, as disclosed in the first embodiment of the present invention.

The present invention optimizes use of RAM space, and therefore, the present invention is applicable to any portable device having memory in which it is desirable to know when stored information in the memory should be deleted in order to make room for new information.

While an example of the present invention has been described in conjunction with alphanumeric messages, the same advantages can be achieved for receiving and storing graphics message information, such as facsimile messages or video messages. Moreover, the present invention has utility in personal data assistant (PDA) devices, data receivers and cellular telephones.

The above description is intended by way of example only and is not intended to limit the present invention in any way except as set forth in the following claims.

What is claimed is:

1. A method for optimizing utilization of a memory which stores messages received in a portable communication device comprising steps of:

providing an adjustable memory full threshold for indicating a memory full condition of the memory;

receiving input from a user of the portable communication device for setting the adjustable memory full threshold;

determining an amount of space available in the memory of the portable communication device;

comparing the amount of space available in the memory with the adjustable memory full threshold;

issuing an indication of a memory full condition if the amount of space available in the memory is less than or equal to the adjustable memory full threshold;

receiving a new message in the portable communication device;

determining the amount of space available in the memory of the portable communication device in response to receiving the new message and determining a size of the new message;

deleting a previously stored message from the memory if the amount of space available in the memory is less than the size of the new message and storing the new message in the memory; and if the amount of space available in the memory is greater than or equal to the size of the new message, then storing the new message in the memory without deleting a previously stored message.

2. The method of claim 1, wherein the adjustable memory full threshold is defined in terms of a character length of a message.

3. The method of claim 1, wherein the step of receiving comprises receiving paging messages in a selective call receiver.

4. The method of claim 1, and further comprising the step of displaying a message on a display of the portable communication device indicating that the memory is full if the amount of space available in the memory is less than the adjustable memory full threshold.

5. The method of claim 1, wherein the step of deleting comprises deleting a particular stored message in the memory on the basis of a status of the particular stored message.

6. The method of claim 1, wherein the step of deleting comprises deleting the particular stored message if it is not indicated as being a protected message.

7. The method of claim 1, and further comprising steps of:

computing an updated average message size each time a new message is received; and automatically adjusting the adjustable memory full threshold based on the updated average message size.

8. A portable communication device for receiving messages transmitted thereto, the device comprising:

receiving means for receiving a signal including a message;

memory means for storing messages received by the portable communications device;

means for inputting by a user an adjustable memory full threshold;

processor means connected to the receiving means, memory means and input means and for determining an amount of space available in a memory means and for comparing the amount of space available in the memory means with the adjustable memory full threshold, the processor means issuing an indication of a memory full condition if the amount of space available in the memory means is less than or equal to the adjustable memory full threshold, said processor means further determining the amount of space available in the memory means of the portable communication device in response to the receiving means receiving a new message and determining a size of the new message, the processor means deleting a previously stored message from the memory means if the amount of space available in the memory means is less than the size of the new message and storing the new message in the memory means, and if the amount of space available in the memory means is greater than or equal to the size of the new message, then storing the new message in the memory means without deleting a previously stored message.

9. The device of further comprising display means for displaying messages received by the portable communication device and other information.

10. The device of claim 9, wherein the memory means stores messages in the form of characters and the adjustable memory full threshold is defined in terms of a character length of a message.

11. The device of claim 9, wherein the processor means generates a message for display by the display means a message indicating that the memory means is full if the amount of space available in the memory is less than the adjustable memory full threshold.

12. The device of claim 8, wherein the processor means:

computes an updated average message size each time a new message is received; and automatically adjusts the adjustable memory full threshold based on the updated average message size.

13. The device of claim 8, wherein the portable communication device is a selective call receiver and the receiving means comprising means for receiving a paging signal.

14. A method for optimizing utilization of a memory which stores messages received in a portable communication device comprising steps of:

providing an adjustable memory full threshold for indicating a memory full condition of the memory;

determining an amount of space available in the memory of the portable communication device;

comparing the amount of space available in the memory with the adjustable memory full threshold;

issuing an indication of a memory full condition if the amount of space available in the memory is less than or equal to the adjustable memory full threshold;

receiving a new message in the portable communication device;

determining the amount of space available in the memory of the portable communication device in response to receiving the new message and determining a size of the new message;

deleting a previously stored message from the memory if the amount of space available in the memory is less than the size of the new message and storing the new message in the memory;

if the amount of space available in the memory is greater than or equal to the size of the new message, then storing the new message in the memory without deleting a previously stored message;

computing an updated average message size each time a new message is received; and automatically adjusting the adjustable memory full threshold based on the updated average message size.

15. The method of claim 14, wherein the step of providing an adjustable memory full threshold comprises initially providing an adjustable default memory full threshold which is updated accordingly with reception of messages by the portable communication device.

16. The method of claim 14, and further comprising the step of receiving input from the user to set the adjustable memory full threshold.

* * * * *

UNITED STATES PATENT AND TRADEMARK OFFICE

CERTIFICATE OF CORRECTION

PATENT NO. : 5,488,359

DATED : January 30, 1996

INVENTOR(S) : Faris, et al.

It is certified that error appears in the above-indentified patent and that said Letters Patent is hereby corrected as shown below:

Column 7, line 8, after of insert --claim 8, and--.

Signed and Sealed this

Twenty-first Day of May, 1996

Attest:

BRUCE LEHMAN

*Attesting Officer* *Commissioner of Patents and Trademarks*